United States Patent [19]
Lee

[11] Patent Number: 6,089,735
[45] Date of Patent: Jul. 18, 2000

[54] EASY-EXCHANGEABLE HEAD LAMP FOR AUTOMOBILES

[75] Inventor: Heon Lee, Kyungki-do, Rep. of Korea

[73] Assignee: Hyundai Motor Company, Seoul, Rep. of Korea

[21] Appl. No.: 08/998,786

[22] Filed: Dec. 29, 1997

[30] Foreign Application Priority Data

Dec. 30, 1996 [KR] Rep. of Korea ........................ 96-76582

[51] Int. Cl.[7] ........................................................ F21Q 1/00
[52] U.S. Cl. ............................ 362/507; 362/374; 362/226
[58] Field of Search ................................... 362/507, 519, 362/374, 375, 226

[56] References Cited

U.S. PATENT DOCUMENTS

| | | | |
|---|---|---|---|
| 5,283,719 | 2/1994 | Sekiguchi | 362/519 X |
| 5,556,190 | 9/1996 | Saijo | 362/226 X |
| 5,653,528 | 8/1997 | Schmidt et al. | 362/226 |
| 5,700,079 | 12/1997 | Woerner et al. | 362/226 X |
| 5,722,768 | 3/1998 | Suzuki et al. | 362/375 X |
| 5,735,596 | 4/1998 | Daumueller | 362/374 X |

Primary Examiner—Laura K. Tso
Attorney, Agent, or Firm—Christie, Parker & Hale, LLP

[57] ABSTRACT

A removable bulb assembly is provided for head lamp structures for automobiles. An upper surface of the housing of the structure has an opening through which the bulb assembly can be inserted or removed. A similar opening is provided in an upper surface of a reflector within the housing. The bulb assembly is removably mounted within the reflector. When necessary, the bulb assembly is removed from the housing to replace a bulb of the assembly.

8 Claims, 2 Drawing Sheets

EASY-EXCHANGEABLE HEAD LAMP FOR AUTOMOBILES

BACKGROUND OF THE INVENTION

1. Field of the Invention

The present invention relates to a head lamp structure for automobiles, and more particularly, to a head lamp structure for automobiles constructed in such a manner that the entire bulb assembly can be separated from the head lamp structure to facilitate replacing the head lamp bulb.

2. Description of prior art

Generally, a head lamp of automobile is a means to secure a visual field during driving at night or on a foggy day.

Typically, a head lamp structure includes a bulb, a reflector around the bulb, and a housing in which the bulb and reflector are located, all of which are positioned in front of the automobile engine.

When it is necessary to replace a bulb of the head lamp structure, a cover 30 in the back of the lamp housing 100a is opened, and the bulb is replaced within the housing, as can be seen from FIG. 1.

However, conventional head lamp structures have a recognized disadvantage in that the narrow gap between the lamp housing and a battery 200 installed behind the housing makes replacing the bulb extremely difficult. As a result of this narrow gap, the space in which one has to work when replacing the bulb is very limited, resulting in a cumbersome and inconvenient work space.

More specifically, since it is necessary to reach through the narrow gap to remove the cover and replace the bulb inside the housing, the process is not only time consuming, but the individual replacing the bulb may scratch or injure his hand during this process.

SUMMARY OF THE INVENTION

To solve from the above mentioned problems that conventional head lamp structures for automobiles have encountered, an objective of the present invention is to provide a head lamp structure for automobiles in which the bulb assembly is removably mounted within the housing so that the entire bulb assembly may be easily removed from the housing in order to change a bulb in the bulb assembly. Specifically, a housing is provided having a front end through which light is to pass, a back end opposite the front end, and an opening in a side between the front end and back end of the housing. A reflector is provided within the housing having a front end through which light is to pass, a back end opposite the front end, and an opening in a side between the front end and the back end of the reflector, and a bulb assembly is removably mounted within the reflector.

In one embodiment, the removable cap of the housing is located on the upper surface of the housing, eliminating the need to reach between the back of the housing and the battery located behind the head lamp structure. The bulb assembly is removably mounted within a reflector which has an opening in its upper surface for receiving the bulb assembly. Means are provided for securing the bulb assembly within the reflector.

When it is necessary to replace a bulb in the bulb assembly, the entire assembly can be removed from the housing, through the opening in the reflector and the opening in the housing, so that changing the bulb becomes a relatively easy task. Once the bulb is replaced, the bulb assembly is inserted back into the housing and properly mounted within the reflector.

To minimize the loss of light associated with this structure, the front surface of the bulb assembly is properly coated so that it is capable of reflecting the light from the bulb.

BRIEF DESCRIPTION OF THE DRAWING

Reference will now be made in more detail to the present preferred embodiment of the invention, an example of which is illustrated in the accompanying drawing.

DETAILED DESCRIPTION OF THE PREFERRED EMBODIMENT

Figure 1:
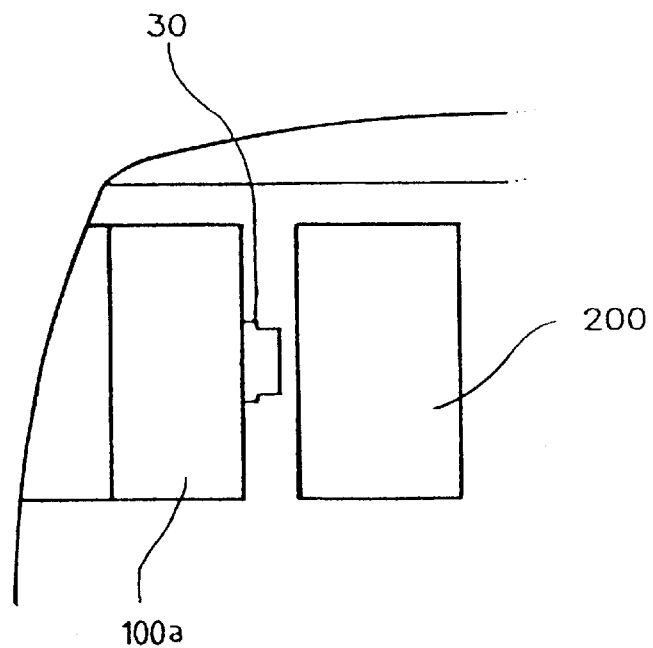
FIG. 1 is an schematic view showing the conventional head lamp structure known in the prior art.
Figure 2:
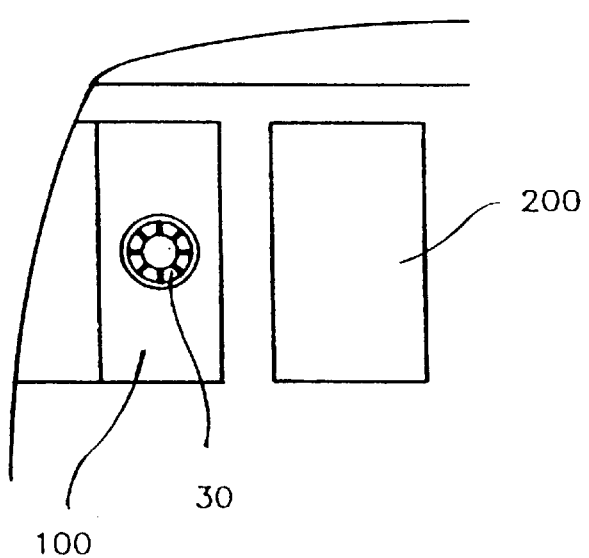
FIG. 2 is an schematic view showing the head lamp structure according to the present invention.
Figure 3:
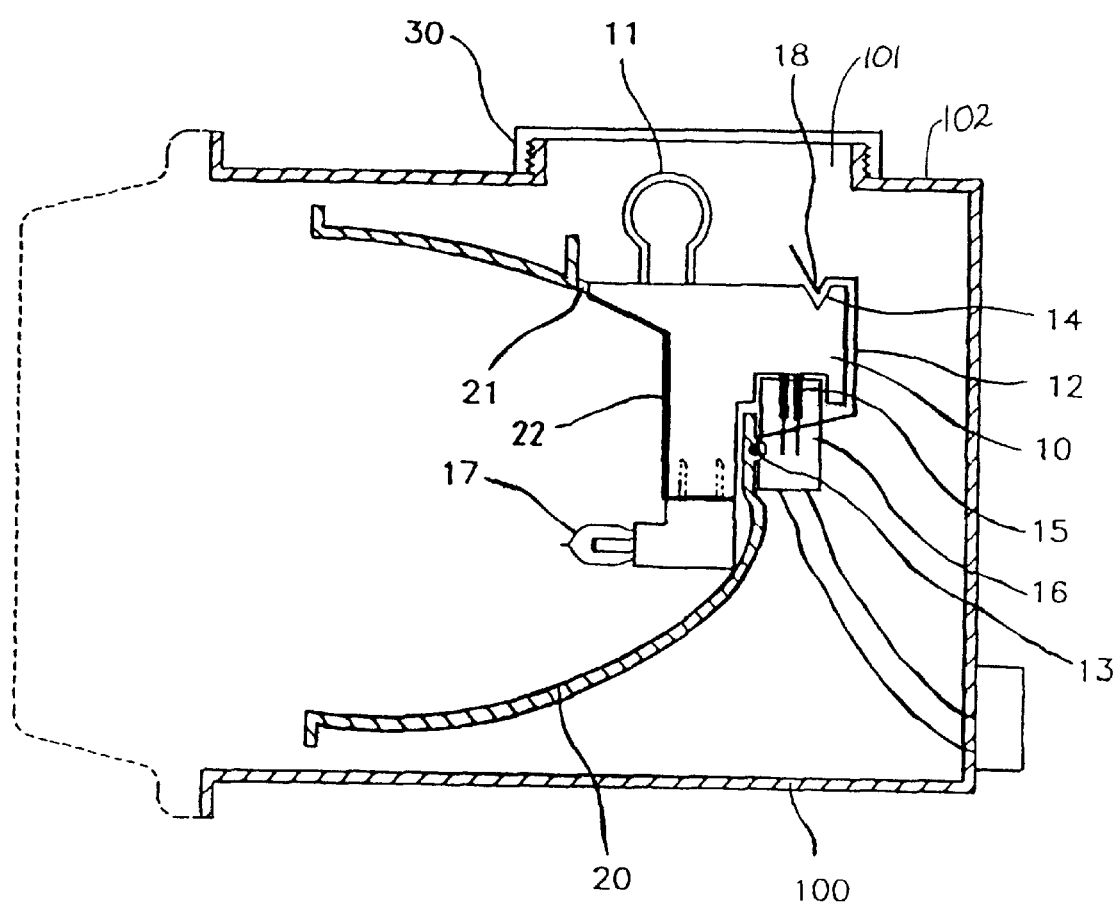
FIG. 3 is a cross sectional view showing the head lamp structure of FIG. 2.

Referring now to FIG. 3, a partially schematic crosssectional view of the head lamp structure according to the present invention is illustrated.

The head lamp structure generally includes a housing 100, a reflector 20 located within the housing 100, and a bulb assembly 10 located within the reflector 20. The housing includes a removable cap 30, positioned over an opening 101 in an upper surface 102 of the housing 100. The opening 101 provides the necessary means for inserting or removing the bulb assembly from the housing. A similar opening 21 is formed in an upper surface of the reflector, through which the bulb assembly is inserted. It should be apparent to those skilled in the art that the opening 21 in the upper surface of the reflector should be of sufficient size to allow insertion of the bulb assembly into the reflector.

The bulb assembly includes a bulb 17 which is received within the reflector, and a bulb connector guide 15 on a lower surface of the bulb assembly which is received within a bulb connector 16 when the bulb assembly is mounted within the reflector.

More specifically, the bulb assembly is removably mounted within the reflector. A fixing pin or spring 12 is used to retain the bulb assembly in the reflector. One end 13 of the fixing pin 12 in pivotally coupled to the reflector, while the other end 18 forms a bending part. The bending part 18 of the fixing pin is inserted into a groove 14 located in an upper surface of the bulb assembly 18, and thus the bulb assembly is securely retained within the reflector.

Additionally, a separating ring 11 is provided on the upper surface of the bulb assembly to assist in removing the bulb assembly from the housing.

When it is necessary to replace the bulb 17, the bulb assembly can be easily removed from the head lamp structure to facilitate the replacement process. Since the removable cover 30 is located on the upper surface of the housing, it is not necessary to reach through the narrow gap between the back of the housing and the battery to remove the cap. Once the cap 30 has been removed, the bending part 18 of the fixing pin is removed from the groove 14 in the bulb assembly by rotating the pin around its hinged end 13. While lifting upward on the separating ring, the bulb connector guide is separated from the bulb connector, so that the bulb assembly may be removed from within the reflector 20 and the housing 100. Once the bulb assembly is removed from the housing, the bulb can easily be replaced as necessary, and then reinserted into the head lamp structure, along with the rest of the bulb assembly.

Another advantage of repositioning the removable cap from the back of the housing to the top of the housing, is that space behind the housing may now be utilized for other functions if necessary.

Additionally, to minimize the loss of light associated with the head lamp structure, the front surface 22 of the bulb assembly which is in parallel with the interior reflector surface is preferably coated with a suitable reflecting material so that light from the bulb reflects off of the front surface 22.

What is claimed:

1. A head lamp structure for automobiles, the structure comprising:

a housing having an upper surface, an opening in the upper surface, and a removable cap for closing the opening in the upper surface of the housing;

a reflector within the housing, the reflector having an opening in its upper surface; and a removable bulb assembly mounted within the reflector, the removable bulb assembly including a bulb, wherein the bulb assembly is capable of being removed from the housing to replace the bulb.

2. The head lamp structure according to claim 1 wherein a front surface of the bulb assembly is a light reflecting surface.

3. The head lamp structure according to claim 2 wherein the front surface of the bulb assembly is coated with a reflective material.

4. The head lamp structure according to claim 1 wherein the bulb assembly further comprises means for securing the bulb assembly to the reflector when the bulb assembly is inserted into the opening in the upper surface of the reflector.

5. The head lamp structure according to claim 4 wherein the securing means comprise a groove on the upper surface of the bulb assembly, and a fixing pin, wherein one end of the fixing pin is pivotally coupled to the reflector and another end of the fixing pin is adapted for insertion into the groove.

6. The head lamp structure according to claim 4 wherein the bulb assembly further comprises a bulb connector guide for insertion into a bulb connector of the head lamp structure.

7. The head lamp structure according to claim 1 wherein the bulb assembly further comprises a separating ring coupled to the upper surface of the bulb assembly to facilitate removal of the bulb assembly from the housing.

8. A head lamp structure for automobiles, the structure comprising:

a housing having a front end through which light is to pass, a back end opposite the front end, and an opening in a side between the front end and back end of the housing;

a reflector mounted within the housing, the reflector having a front end through which light is to pass, a back end opposite the front end, and an opening in a side between the front end and the back end of the reflector; and a bulb assembly removably mounted within the reflector.

* * * * *